(12) United States Patent
Kumar et al.

(10) Patent No.: US 11,692,494 B2
(45) Date of Patent: Jul. 4, 2023

(54) AUTOMATED ENGINE VIBRATION MONITORING AND CONTROL SYSTEM

(71) Applicant: HONEYWELL INTERNATIONAL INC., Charlotte, NC (US)

(72) Inventors: Anil Kumar, Bangalore (IN); Rohith S, Bangalore (IN); Rajan Gupta, Bangalore (IN); Chakkaravarthy Vairavan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 141 days.

(21) Appl. No.: 17/212,055

(22) Filed: Mar. 25, 2021

(65) Prior Publication Data
US 2022/0252014 A1     Aug. 11, 2022

(30) Foreign Application Priority Data

Feb. 10, 2021   (IN) .............................. 202111005660

(51) Int. Cl.
*F02C 9/00*     (2006.01)
*B64D 27/10*    (2006.01)
*B64D 31/06*    (2006.01)
*B64D 43/00*    (2006.01)
*B64D 45/00*    (2006.01)

(52) U.S. Cl.
CPC ................ *F02C 9/00* (2013.01); *B64D 27/10* (2013.01); *B64D 31/06* (2013.01); *B64D 43/00* (2013.01); *B64D 45/00* (2013.01); *B64D 2045/0085* (2013.01); *F05D 2270/301* (2013.01); *F05D 2270/303* (2013.01); *F05D 2270/334* (2013.01)

(58) Field of Classification Search
CPC .... B64D 45/00; B64D 45/0031; B64D 31/00; B64D 31/02; B64D 31/06; B64D 31/14; B64D 2045/0085; F01D 25/04; G01M 15/12; G05B 23/02; G05B 23/0286; F05D 2260/96
See application file for complete search history.

(56) References Cited

U.S. PATENT DOCUMENTS 3,053,486 A     9/1962  Auld
7,222,002 B2    5/2007  Maine
7,568,662 B1 *  8/2009  Conner .............. B64D 45/0031
                                           244/175
(Continued)

FOREIGN PATENT DOCUMENTS

EP         3626628 A1    3/2020
WO    2020/079675 A1    4/2020

*Primary Examiner* — Alain Chau
(74) *Attorney, Agent, or Firm* — Lorenz & Kopf LLP

(57) ABSTRACT

An engine vibration monitoring and control system includes an aircraft autopilot and a flight management system (FMS). The FMS is in operable communication with the aircraft autopilot and is configured to determine when the aircraft autopilot is engaged and disengaged. The FMS is also adapted to receive vibration data from an engine vibration data source and is configured, upon determining that the aircraft autopilot is engaged, to: process the vibration data to determine when engine vibrations exceed one or more first thresholds, and when the engine vibrations exceed the one or more first thresholds, supply commands to the autopilot that cause the autopilot to take corrective actions to reduce the engine vibrations below the one or more first thresholds.

17 Claims, 5 Drawing Sheets

(56) References Cited

U.S. PATENT DOCUMENTS

| | | |
|---|---|---|
| 8,634,972 B2 | 1/2014 | Mathews, Jr. et al. |
| 9,454,908 B2 * | 9/2016 | Moune et al. |
| 10,071,820 B2 * | 9/2018 | Joshi .................... G01H 1/006 |
| 10,242,579 B2 * | 3/2019 | Garai ..................... B64D 43/02 |
| 10,611,501 B2 | 4/2020 | Wirth et al. |
| 10,677,170 B2 | 6/2020 | Patry et al. |
| 10,703,504 B2 | 7/2020 | Ziarno |
| 10,748,433 B2 | 8/2020 | Schwindt |
| 2008/0276620 A1 * | 11/2008 | Ullyott ................... F01D 21/06 |
| | | 60/773 |
| 2009/0110541 A1 * | 4/2009 | Southwick ............... F02C 9/28 |
| | | 415/119 |
| 2009/0179114 A1 * | 7/2009 | Conner .............. B64D 45/0034 |
| | | 244/189 |
| 2015/0293503 A1 * | 10/2015 | Wall .......................... F02C 9/00 |
| | | 700/28 |
| 2017/0358219 A1 * | 12/2017 | Garai ..................... G08G 5/003 |
| 2018/0079520 A1 * | 3/2018 | Joshi ........................ F02C 9/28 |
| 2018/0107228 A1 * | 4/2018 | Williams ............. G05D 1/0808 |
| 2020/0258405 A1 | 8/2020 | Fern et al. |
| 2020/0317366 A1 * | 10/2020 | Clampitt, III .......... B64D 45/00 |
| 2020/0317367 A1 * | 10/2020 | Clampitt, III ........ G07C 5/0808 |
| 2020/0346748 A1 | 11/2020 | Riverin et al. |
| 2021/0062726 A1 * | 3/2021 | Kathirchelvan ....... B64D 31/12 |

* cited by examiner

Boeing 737NG

*Icing Condition*

One engine at a time at ~15 mins. intervals

ENGINE START switch  —  FLT

Thrust — Adjust to 45% N1 for 5 secs.
Advance slowly to 85% N1 for 1 sec.

*Non-Icing Condition*

Auto throttle  —  Disengage

Thrust Lever  —  Retard to maintain vibration levels < 4 units

If vibration levels do not decrease check other engine parameters if they are normal. If yes, no action required.

FIG. 4

Airbus A320 Family & A330

*Icing Condition*

AUTO THRUST — OFF

ENGINE ANTI ICE — Check
(Switch it ON if OFF)

THRUST LEVER — Increase Thrust

*Non-Icing Condition*

ENG PARAMETERS — Check
(Especially EGT & cross check with other engine)

If rapid increase above advisory

THRUST LEVER — Retard

FIG. 5

AUTOMATED ENGINE VIBRATION MONITORING AND CONTROL SYSTEM

CROSS-REFERENCE TO RELATED APPLICATION

This application claims priority to Indian Provisional Patent Application No. 202111005660, filed Feb. 10, 2021, the entire content of which is incorporated by reference herein.

TECHNICAL FIELD

The present disclosure generally relates to engine vibration monitoring, and more particularly relates to a system for automated engine vibration monitoring and control.

BACKGROUND

The propulsion engines are typically the most expensive components on an aircraft. The cost of a new propulsion engines can be as much as $20 million. Moreover, propulsion engine repairs can also be relatively expensive, especially when the engine is taken out of service.

One of the most problematic sources of engine repairs is those that result from engine vibrations. Engine vibrations can cause parts to become out of balance, which can eventually cause cracked turbine, fan, or compressor components. Engine vibrations can also cause general metal fatigue and have various other deleterious effects.

There are various causes of engine vibrations. These include, for example, ice formation, turbine blade release, and foreign object damage, blade material loss, and bearing wear, just to name a few. If corrective actions are not taken within a relatively short time period, the vibrations can cause engine damage, which may be significant enough to cause the engine to be scrapped. Currently, based on the intensity of the vibrations, a pilot is required to manually take corrective actions to reduce the engine vibrations by referring to guidance published in the Quick Reference Handbook (QRH). While potentially effective, this can be a tedious, time-consuming procedure, and the corrective actions may not be implemented in sufficient time to prevent engine damage.

Hence, there is a need for a system and method of automated aircraft engine vibration monitoring and control. In particular, a system and method that does not rely solely on pilot intervention. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an engine vibration monitoring and control system includes an aircraft autopilot and a flight management system (FMS). The FMS is in operable communication with the aircraft autopilot and is configured to determine when the aircraft autopilot is engaged and disengaged. The FMS is also adapted to receive vibration data from an engine vibration data source and is configured, upon determining that the aircraft autopilot is engaged, to: process the vibration data to determine when engine vibrations exceed one or more first thresholds, and when the engine vibrations exceed the one or more first thresholds, supply commands to the autopilot that cause the autopilot to take corrective actions to reduce the engine vibrations below the one or more first thresholds.

In another embodiment, a method for monitoring engine vibrations and automatically controlling aircraft gas turbine engines includes supplying vibration data from an engine vibration data source to a flight management system (FMS), and supplying an autopilot status signal from an aircraft autopilot to the FMS, where the autopilot status signal is representative of whether the autopilot is engaged or disengaged. A determination is made in the FMS, and based on the autopilot status signal, when the aircraft autopilot is engaged and disengaged. When the FMS determines that the aircraft autopilot is engaged: the vibration data are processed in the FMS to determine when engine vibrations exceed one or more first thresholds, and when the engine vibrations exceed the one or more first thresholds, commands are supplied from the FMS to the autopilot that cause the autopilot to take corrective actions to reduce the engine vibrations below the one or more first thresholds.

In yet another embodiment, an engine vibration monitoring and control system includes an aircraft autopilot, an engine vibration data source, and a flight management system (FMS). The engine vibration data source is configured to supply vibration data. The FMS is in operable communication with the aircraft autopilot and the engine vibration data source. The FMS is configured to (i) determine when the aircraft autopilot is engaged and disengaged and (ii) upon determining that the aircraft autopilot is engaged, to: process the vibration data to determine when engine vibrations exceed one or more first thresholds and when the engine vibrations exceed one or more second thresholds, when the engine vibrations exceed the one or more first thresholds, supply commands to the autopilot that cause the autopilot to take corrective actions to reduce the engine vibrations below the one or more first thresholds, and when the engine vibrations exceed the one or more second thresholds, generate an alert to a pilot to take manual control.

Furthermore, other desirable features and characteristics of the engine vibration monitoring and control system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 4 depicts example pilot actions for high engine vibrations published in the QRH for a Boeing 737NG aircraft; and FIG. 5 depicts example pilot actions for high engine vibrations published in the QRH for the Airbus A320 and A330 families.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
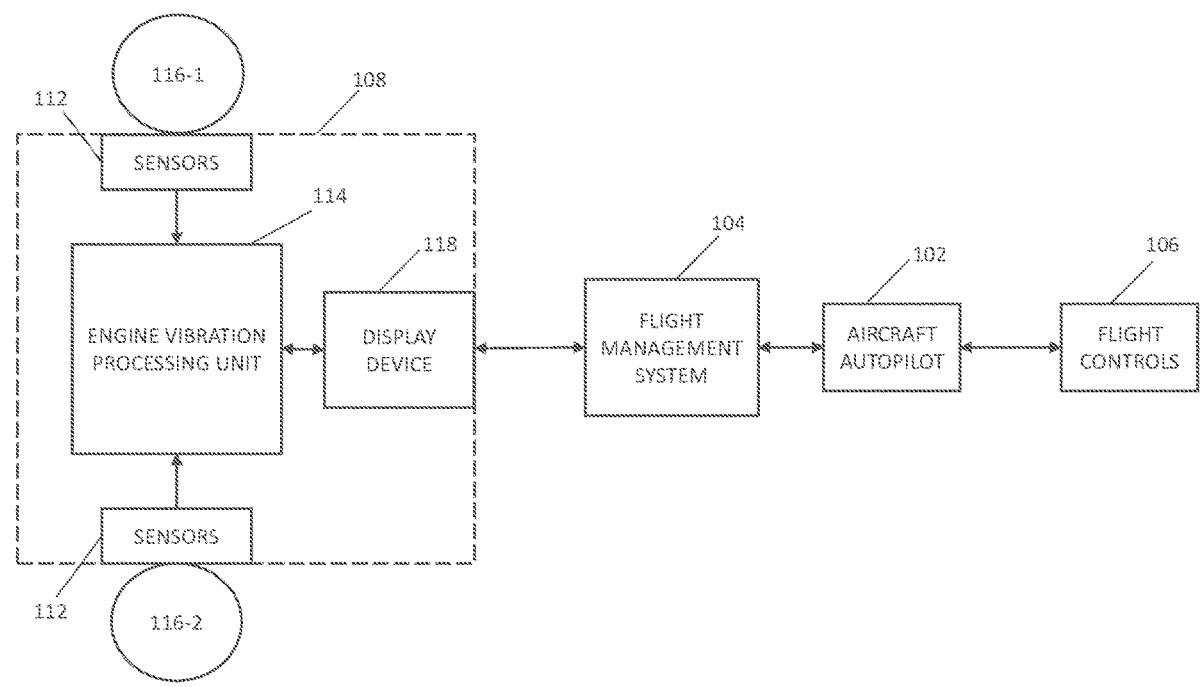
FIG. 1 depicts a functional block diagram of one embodiment of an engine vibration monitoring and control system.

Referring now to FIG. 1, a functional block diagram of one embodiment of an engine vibration monitoring and control system 100 is depicted. The depicted system 100 includes at least an aircraft autopilot 102 and a flight management system (FMS) 104. The aircraft autopilot 102, as is generally known by those skilled in the art, is a system that, when engaged, receives flight control commands from a flight computer, such as the FMS 104. The aircraft autopilot 102 processes the flight control commands and supplies commands to the aircraft flight controls 106 that cause the aircraft to implement the commands. The flight controls 106 may include, for example, engine throttle controls and flight control surface controls. As may be appreciated, when the autopilot is disengaged, it does not process the flight control commands, and thus does not command the aircraft flight controls 106.

The FMS 104 is in operable communication with the aircraft autopilot 102 and is configured, among other functions, to determine when the aircraft autopilot 102 is engaged and disengaged. As is generally known, the FMS 104 is a specialized processing system that automates, among other things, the flight plan. The flight plan is generally determined on the ground before departure by either the pilot or a dispatcher for the aircraft flight crew. The flight plan, which comprises, but is not limited to, a set of aircraft data that is generally referred to as flight plan data, may be manually entered into the FMS 104 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. Regardless of how the flight plan is entered, the FMS 104 receives and loads the flight plan into its working memory and uses the current flight plan to automate the flight of the aircraft. This may be accomplished by, for example, supplying the flight control commands to aircraft autopilot 102.

In addition to the general functionality described above, the FMS 104 is further adapted to receive vibration data from an engine vibration data source 108. The FMS 104 is further configured, upon determining that the aircraft autopilot 102 is engaged, to process the vibration data to determine when engine vibrations exceed at least one or more first thresholds. The FMS 104 is also configured, upon determining that the aircraft autopilot 102 is engaged and upon determining when the engine vibrations exceed the one or more first thresholds, to supply commands to the aircraft autopilot 102 that cause the aircraft autopilot 102 to take corrective actions to reduce the engine vibrations below the one or more first thresholds.

The FMS 104 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the off-board computing device 102 includes processing logic that may be configured to carry out the functions, techniques, and processing tasks associated with the operation of the system 100 described in greater detail below. Furthermore, the steps of a method or algorithm described in connection with the embodiments disclosed herein may be embodied directly in hardware, in firmware, in a software module executed by the FMS 104, or in any practical combination thereof. In accordance with one or more embodiments, the FMS 104 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the FMS 104, cause the FMS 104 to execute and perform one or more of the processes, tasks, operations, and/or functions described herein.

Before proceeding further, it is noted that the engine vibration data source 108 may be variously configured and implemented. In the depicted embodiment, however, the engine vibration data source 108 includes at least a plurality of vibration sensors 112 and an engine vibration processing unit 114. Each vibration sensor 112 is operable to sense vibrations within an aircraft gas turbine propulsion engine 116 and supply sensor signals representative of the sensed vibrations. In the depicted embodiment, the system 100 is installed within an aircraft that includes two gas turbine propulsion engines 116 (e.g., 116-1, 116-2). Thus, there are a plurality of vibration sensors 112 associated each of the two gas turbine propulsion engines 116-1, 116-2.

Regardless of the number of gas turbine propulsion engines 116, the engine vibration processing unit 114 is coupled to receive the sensor signals from each of the vibration sensors 112 and is configured, upon receipt of the sensor signals, to process and supply the vibration data. In some embodiments the vibration data may be supplied directly to the FMS 104. In other embodiments, such as the one depicted in FIG. 1, the vibration data are supplied to the FMS 104 via a display device 118. It will be appreciated that the engine vibration processing unit 114 may be implemented as a stand-alone device or it may be implemented as part of another device or system. For example, the engine vibration processing unit 114 may be included in a conventional aircraft Engine Vibration Monitoring System. In either case, the engine vibration processing unit 114 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the engine vibration processing unit 114 includes processing logic that may be configured to carry out its functions.

It will additionally be appreciated that the display device 118 may be implemented as a stand-alone device or it may be implemented as part of another device or system. For example, the display device 118 may be implemented in an Engine-Indicating and Crew-Alerting System (EICAS) or in an Electronic Centralized Aircraft Monitoring (ECAM) system. The display device 118, when included, is in operable communication with the engine vibration processing unit 114 and supplies the vibration data to the FMS 104. The display device 118 is also responsive to display commands to render one or more images. The images that the display device 118 renders may vary depending, for example, on whether it is implemented in an EICAS or and ECAM system. In either case, the engine vibration processing unit 114 is further configured to at least selectively supply commands to the display device 114 that cause the display device to render one or more alerts associated with the vibration data. For example, the display device 118 may be commanded to render an alert informing the pilot that the FMS 104 is commanding the aircraft autopilot 102 to take corrective actions associated with the sensed engine vibrations exceeding one or more of the first thresholds.

Returning to the FMS 104, it is noted that the one or more first thresholds are vibration thresholds associated with relatively low-level vibrations. Such relatively low-level vibrations may be caused by, for example, icing conditions on or in an engine 116, a compressor surge, or released compressor or turbine blades. For these relatively low-level vibrations, the levels of which may vary from engine-to-engine, the FMS 104 will command the aircraft autopilot 102 to take the appropriate corrective actions. However, for relatively high-level vibrations, the levels of which may also vary from engine-to-engine, and which may be caused, for example, by a bird (or other foreign object) ingestion, or a released fan blade, it is preferred that the pilot take corrective actions. Thus, the FMS 104 is additionally configured, upon determining that the aircraft autopilot 102 is engaged, to process the vibration data to determine when the engine vibrations exceed one or more second thresholds (e.g., thresholds associated with relatively high-level vibrations). When the engine vibrations exceed one or more of the second thresholds, the FMS 104 will generate an alert via, for example, the display device 118, informing the pilot to disengage the aircraft autopilot 102 and take manual control of the aircraft to reduce the sensed engine vibrations.

It is also preferable that the corrective actions commanded by the FMS 104 do not result in undesirable conditions. For example, it is preferable that the FMS 104 not command the aircraft autopilot 102 in such a manner that the thrust generated by one or more of the engines 116 drops below a predetermined thrust level. It will be appreciated that the predetermined thrust level may vary from aircraft-to-aircraft. Thus, the FMS 104 is further configured to determine if the commands supplied to the aircraft autopilot 102 will cause engine thrust to decrease below a predetermined thrust level. When the FMS 104 determines that the commands supplied to the aircraft autopilot 102 will cause engine thrust to decrease below the predetermined thrust level, the FMS 104 prevents the commands from being supplied to the aircraft autopilot 102. In some embodiments, the FMS 104 may also generate an alert via, for example, the display device 118, informing the pilot of this condition.

On most aircraft, the FMS 104 also receives various engine and environmental parameter data. For example, the FMS 104 may also receive ambient air temperature data, engine pressure ratio data, and inter turbine temperature (ITT) data. For those embodiments, the FMS 104 is also preferably configured to determine the cause of the engine vibrations exceeding the one or more first thresholds. More specifically, the FMS 104 is preferably configured, based upon the ambient air temperature data, the engine pressure ratio data, and the inter turbine temperature data, to determine if the cause of the engine vibrations exceeding the one or more first thresholds is due to engine icing, an engine surge, or a fan-blade-off condition. Thus, the commands supplied from the FMS 104 to the aircraft autopilot 102 will cause the aircraft autopilot 102 to take corrective actions associated with the determined cause of the engine vibrations.

The FMS 104, as previously noted, may be used to implement a flight plan. Thus, in the system 100 disclosed herein, when the FMS 104 is implementing a flight plan, the FMS 104 is additionally configured to maintain the flight plan while supplying the commands to the aircraft autopilot 102 that cause the aircraft autopilot 102 to take the corrective actions to reduce the engine vibrations below the one or more first thresholds. As just one simplified example, if the thrust generated by one engine 116-1 (116-2) may need to be reduced as part of the corrective action, the thrust generated by the other engine (116-2 (116-1) may need to be increased to maintain the current flight plan.

Figure 2:
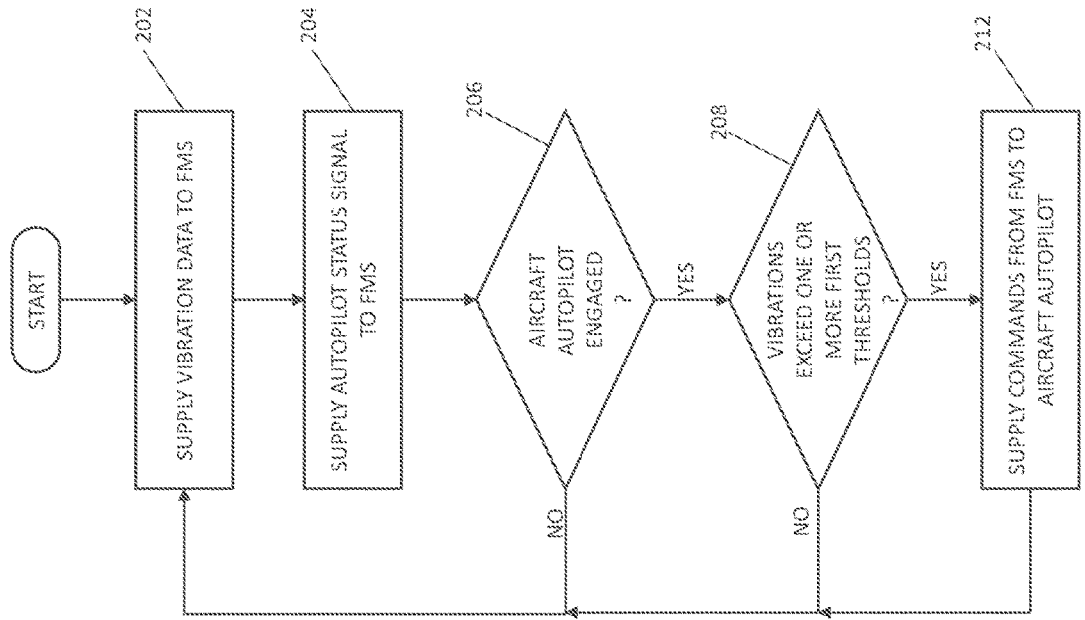
FIG. 2 depicts an embodiment of a process, in flowchart form, that may be implemented by the system of FIG. 1.

The system 100 is configured to implement the above-described process for monitoring engine vibrations and automatically controlling aircraft gas turbine propulsion engines. The process 200 is depicted in flowchart form in FIG. 2, and with reference thereto will now be described. In doing so, parenthetical reference numerals refer to like flowchart symbols in FIG. 2. It should be appreciated that the depicted process 200 may include any number of additional or alternative tasks, the tasks need not be performed in the illustrated order and/or the tasks may be performed concurrently, and/or the process 200 may be incorporated into a more comprehensive procedure or process having additional functionality not described in detail herein.

The depicted process 200 includes supplying vibration data from the engine vibration data source 108 to the FMS 104 (202) and an autopilot status signal from the aircraft autopilot 102 to the FMS 104 (204). The FMS 104 determines, based on the autopilot status signal, when the aircraft autopilot is engaged and disengaged (206). When the FMS 104 determines that the aircraft autopilot 102 is disengaged, the process loops back. However, when the FMS 104 determines that the aircraft autopilot 102 is engaged, the FMS 104 processes the vibration data to determine when engine vibrations exceed one or more of the first thresholds (208). When the engine vibrations do not exceed one or more the first thresholds, the process loops back. However, when the FMS 104 determines that the engine vibrations exceed one or more of the first thresholds, the FMS 104 supplies commands to the aircraft autopilot 102 that cause the aircraft autopilot 102 to take corrective actions to reduce the engine vibrations below the one or more first thresholds (212).

Figure 3:
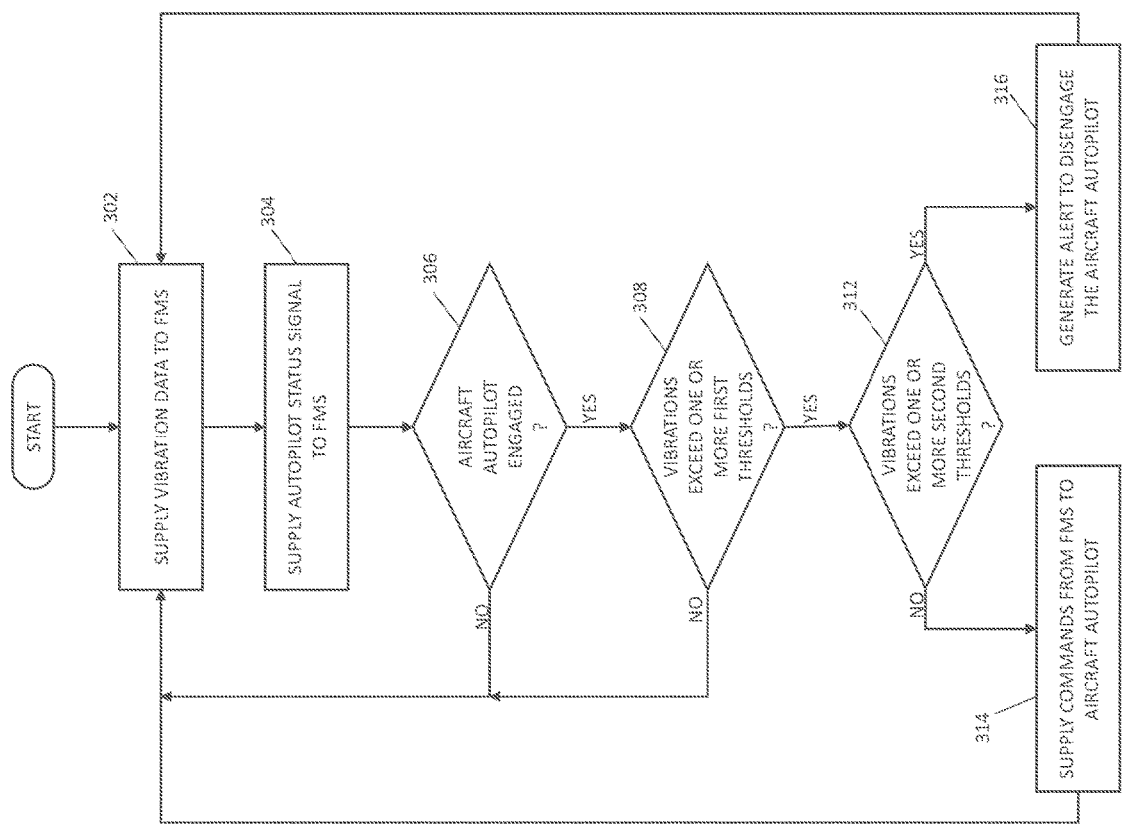
FIG. 3 depicts an embodiment of another process, in flowchart form, that may be implemented by the system of FIG. 1.

As was noted above, in some systems 100 the FMS 104 may be configured to generate an alert informing the pilot to disengage the aircraft autopilot 102 and take manual control of the aircraft when the engine vibrations exceed one or more of the second thresholds. An example process 300 implemented by these systems 100 is depicted in FIG. 3 and will now be described. In doing so, parenthetical reference numerals refer to like flowchart symbols in FIG. 3. It should be appreciated that the depicted process 300 may include any number of additional or alternative tasks, the tasks need not be performed in the illustrated order and/or the tasks may be performed concurrently, and/or the process 300 may be incorporated into a more comprehensive procedure or process having additional functionality not described in detail herein.

The depicted process 300 includes supplying vibration data from the engine vibration data source 108 to the FMS 104 (302) and an autopilot status signal from the aircraft autopilot 102 to the FMS 104 (304). The FMS 104 determines, based on the autopilot status signal, when the aircraft autopilot is engaged and disengaged (306). When the FMS 104 determines that the aircraft autopilot 102 is disengaged, the process loops back. However, when the FMS 104 determines that the aircraft autopilot 102 is engaged, the FMS 104 processes the vibration data to determine when engine vibrations exceed one or more of the first thresholds (308). When the engine vibrations do not exceed one or more the first thresholds, the process loops back. However, when the FMS 104 determines that the engine vibrations exceed one or more of the first thresholds, the FMS 104 also processes the vibration data to determine when engine vibrations exceed one or more of the second thresholds (312). When the engine vibrations do not exceed one or more the second thresholds, the FMS 104 supplies commands to the aircraft autopilot 102 that cause the aircraft autopilot 102 to take corrective actions to reduce the engine vibrations below the one or more first thresholds (314). However, when the engine vibrations do exceed the one or more second thresholds, the FMS 104 generate an alert informing the pilot to disengage the aircraft autopilot 102 and take manual control of the aircraft (316).

It should be noted that the corrective actions commanded by the FMS 104 and implemented by the aircraft autopilot 102 will mirror the corrective actions that are provided in the Quick Reference Handbook (QRH) for the particular airframe in which the system 100 is installed. For completeness, some example pilot actions for high engine vibrations published in the QRH for a Boeing 737NG aircraft are depicted in FIG. 4, and pilot actions for high engine vibrations published in the QRH for the Airbus A320 and A330 families are depicted in FIG. 5. These depicted examples are non-limiting and are provided just as examples of the types of actions that may be automated by the discloses system 100.

Those of skill in the art will appreciate that the various illustrative logical blocks, modules, circuits, and algorithm steps described in connection with the embodiments disclosed herein may be implemented as electronic hardware, or computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like.

The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine vibration monitoring and control system, comprising:
    an aircraft autopilot; and
    a flight management system (FMS) in operable communication with the aircraft autopilot and configured to determine when the aircraft autopilot is engaged and disengaged, the FMS adapted to receive vibration data from an engine vibration data source and configured, upon determining that the aircraft autopilot is engaged, to:
        process the vibration data to determine when engine vibrations exceed one or more first thresholds;
        when the engine vibrations exceed the one or more first thresholds, supply commands to the autopilot that cause the autopilot to take corrective actions to reduce the engine vibrations below the one or more first thresholds;
        determine if the commands supplied to the autopilot will cause engine thrust to decrease below a predetermined thrust level; and
        when the commands supplied to the autopilot will cause engine thrust to decrease below the predetermined thrust level, prevent the commands from being supplied to the autopilot.

2. The system of claim 1, wherein the FMS is further configured, upon determining that the aircraft autopilot is engaged, to:
    process the vibration data to determine when the engine vibrations exceed one or more second thresholds; and
    when the engine vibrations exceed the one or more second thresholds, generate an alert to a pilot to take manual control.

3. The system of claim 1, wherein the engine vibration data source comprises:
    a plurality of vibration sensors, each sensor operable to sense vibrations within an aircraft gas turbine engine and supply sensor signals representative of the sensed vibrations; and
    an engine vibration processing unit coupled to receive the sensor signals from each of the vibration sensors and configured, upon receipt of the sensor signals, to process and supply the vibration data.

4. The system of claim 3, wherein:
    the engine vibration data source further comprises a display device in operable communication with the engine vibration processing unit, the display device responsive to display commands to render one or more images; and
    the engine vibration processing unit is further configured to selectively supply commands to the display device that cause the display device to render one or more alerts associated with the vibration data.

5. The system of claim 1, wherein the FMS is further configured to generate an alert indicating that the commands are prevented from being supplied to the autopilot.

6. The system of claim 1, wherein:
    the FMS is further adapted to receive ambient air temperature data, engine pressure ratio data, and inter turbine temperature data;

the FMS is further configured to determine, based upon the ambient air temperature data, the engine pressure ratio data, and the inter turbine temperature data, if a cause of the engine vibrations exceeding the one or more first thresholds is due to engine icing, an engine surge, or a fan-blade-off condition; and the commands supplied from the FMS to the autopilot cause the autopilot to take corrective actions associated with the determined cause of the engine vibrations.

7. The system of claim 1, wherein the FMS is further configured, when the FMS is implementing a flight plan, to maintain the flight plan while supplying the commands to the autopilot that cause the autopilot to take corrective actions to reduce the engine vibrations below the one or more first thresholds.

8. A method for monitoring engine vibrations and automatically controlling aircraft gas turbine engines, the method comprising the steps of:
   supplying vibration data from an engine vibration data source to a flight management system (FMS);
   supplying an autopilot status signal from an aircraft autopilot to the FMS, the autopilot status signal representative of whether the autopilot is engaged or disengaged;
   determining in the FMS, and based on the autopilot status signal, when the aircraft autopilot is engaged and disengaged; and
   when the FMS determines that the aircraft autopilot is engaged:
      processing the vibration data in the FMS to determine when engine vibrations exceed one or more first thresholds;
      when the engine vibrations exceed the one or more first thresholds, supplying commands from the FMS to the autopilot that cause the autopilot to take corrective actions to reduce the engine vibrations below the one or more first thresholds;
      processing the vibration data in the FMS to determine when the engine vibrations exceed one or more second thresholds; and
      when the engine vibrations exceed the one or more second thresholds, supplying commands from the FMS to generate an alert to a pilot to take manual control.

9. The method of claim 8, further comprising:
   determining, in the FMS, if the commands supplied to the autopilot will cause engine thrust to decrease below a predetermined thrust level; and
   when the commands supplied to the autopilot will cause engine thrust to decrease below the predetermined thrust level, preventing the commands from being supplied from the FMS to the autopilot.

10. The method of claim 8, further comprising:
    supplying ambient air temperature data, engine pressure ratio data, and inter turbine temperature data to the FMS; and
    processing the ambient air temperature data, the engine pressure ratio data, and the inter turbine temperature data in the FMS to determine if a cause of the engine vibrations exceeding the one or more first thresholds is due to engine icing, an engine surge, or a fan-blade-off condition.

11. The method of claim 10, wherein the commands supplied from the FMS to the autopilot cause the autopilot to take corrective actions associated with the determined cause of the engine vibrations.

12. The method of claim 8, further comprising:
    maintaining a flight plan in the FMS while the FMS is supplying the commands to the autopilot that cause the autopilot to take corrective actions to reduce the engine vibrations below the one or more first thresholds.

13. An engine vibration monitoring and control system, comprising:
    an aircraft autopilot;
    an engine vibration data source configured to supply vibration data; and
    a flight management system (FMS) in operable communication with the aircraft autopilot and the engine vibration data source, the FMS configured to (i) determine when the aircraft autopilot is engaged and disengaged and (ii) upon determining that the aircraft autopilot is engaged, to:
       process the vibration data to determine when engine vibrations exceed one or more first thresholds and when the engine vibrations exceed one or more second thresholds;
       when the engine vibrations exceed the one or more first thresholds, supply commands to the autopilot that cause the autopilot to take corrective actions to reduce the engine vibrations below the one or more first thresholds; and
       when the engine vibrations exceed the one or more second thresholds, generate an alert to a pilot to take manual control.

14. The system of claim 13, wherein the engine vibration data source comprises:
    a plurality of vibration sensors, each sensor operable to sense vibrations within an aircraft gas turbine engine and supply sensor signals representative of the sensed vibrations;
    a display device responsive to display commands to render one or more images; and
    an engine vibration processing unit in operable communication with the plurality of vibration sensors and the display device, the engine vibration sensor coupled to receive the sensor signals from each of the vibration sensors and configured, upon receipt of the sensor signals, to (i) process and supply the vibration data and (ii) selectively supply commands to the display device that cause the display device to render one or more alerts associated with the vibration data.

15. The system of claim 13, wherein the FMS is further configured to:
    determine if the commands supplied to the autopilot will cause engine thrust to decrease below a predetermined thrust level; and
    when the commands supplied to the autopilot will cause engine thrust to decrease below the predetermined thrust level, prevent the commands from being supplied to the autopilot.

16. The system of claim 13, wherein:
    the FMS is further adapted to receive ambient air temperature data, engine pressure ratio data, and inter turbine temperature data; and
    the FMS is further configured to determine, based upon the ambient air temperature data, the engine pressure ratio data, and the inter turbine temperature data, if a cause of the engine vibrations exceeding the one or more first thresholds is due to engine icing, an engine surge, or a fan-blade-off condition, wherein the commands supplied from the FMS to the autopilot cause the autopilot to take corrective actions associated with the determined cause of the engine vibrations.

17. The system of claim 13, wherein the FMS is further configured, when the FMS is implementing a flight plan, to maintain the flight plan while supplying the commands to the autopilot that cause the autopilot to take corrective actions to reduce the engine vibrations below the one or more first thresholds.

* * * * *